(12) United States Patent
Kojina

(10) Patent No.: US 7,653,728 B2
(45) Date of Patent: Jan. 26, 2010

(54) AUDIO SERVER

(75) Inventor: Atsushi Kojina, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 210 days.

(21) Appl. No.: 11/959,584

(22) Filed: Dec. 19, 2007

(65) Prior Publication Data

US 2008/0155065 A1    Jun. 26, 2008

(30) Foreign Application Priority Data

Dec. 26, 2006    (JP) .............................. 2006-348812

(51) Int. Cl.
*G06F 15/173* (2006.01)
(52) U.S. Cl. ...................... 709/225; 709/224; 709/231; 709/228; 5/5
(58) Field of Classification Search ................. 709/224, 709/225, 228, 231; 725/5
See application file for complete search history.

(56) References Cited

U.S. PATENT DOCUMENTS

| | | | | |
|---|---|---|---|---|
| 6,567,847 | B1 * | 5/2003 | Inoue | 709/219 |
| 6,618,752 | B1 * | 9/2003 | Moore et al. | 709/217 |
| 7,424,528 | B2 * | 9/2008 | Cherkasova et al. | 709/224 |
| 2002/0156909 | A1 * | 10/2002 | Harrington | 709/231 |
| 2006/0217060 | A1 * | 9/2006 | Tsutsui et al. | 455/3.02 |
| 2008/0222705 | A1 * | 9/2008 | Goodmon et al. | 726/4 |

FOREIGN PATENT DOCUMENTS

| | | |
|---|---|---|
| JP | 2001147939 | 5/2001 |
| JP | 2001338236 | 12/2001 |
| JP | 2005352601 | 12/2005 |

* cited by examiner

*Primary Examiner*—Khanh Q Dinh
(74) *Attorney, Agent, or Firm*—Pillsbury Winthrop Shaw Pittman, LLP

(57) ABSTRACT

When an information processing device has been connected to this audio server via a network, an evaluation request means of this audio server requests this connected information processing device to notify evaluations for items of audio contents which that information processing device has downloaded in the past. And, when an evaluation for some item of audio contents has been received from an information processing device which has been requested to provide notification of evaluations for items of audio contents by the evaluation request notification means, a summarization means of this audio server summarizes a plurality of evaluations for that item of audio contents, using the evaluation obtained this time. And a summarized results notification means of this audio server notifies the result of summarization by said summarization means to the information processing device which provided this evaluation of that item of audio contents this time.

5 Claims, 4 Drawing Sheets

FIG.3

EVALUATION INFORMATION

| NUMBER OF ITEM OF AUDIO CONTENTS | EVALUATION LEVEL | | | | |
|---|---|---|---|---|---|
| | 1 | 2 | 3 | 4 | 5 |
| 1234567890 | 1234 | 641 | 2156 | 489 | 354 |
| 1234567891 | 1861 | 5421 | 6421 | 4135 | 123 |
| 1234567892 | 947 | 754 | 3256 | 3579 | 4624 |

AUDIO SERVER

CROSS REFERENCE

This Nonprovisional application claims priority under 35 U.S.C. § 119(a) on Patent Application No. 2006-348812 filed in Japan on Dec. 26, 2006, the entire contents of which are hereby incorporated by reference.

BACKGROUND OF THE INVENTION

The present invention relates to an audio server which distributes audio contents to users by employing a network such as the internet or the like.

In the prior art, services have been implemented which distribute items of audio contents (music) to users by employing a network such as the internet or the like. With such a service, an audio server is utilized upon which a plurality of items of audio content are stored. This audio server is connected to a network. A user actuates an information processing device such as a personal computer or a portable terminal or the like, and accesses the audio server via the network. And, upon being thus accessed, the audio server selects the desired item of audio contents from the various items of audio contents which it is storing, and downloads this desired item to the user via the network. In particular, recently, along with the widespread dissemination of portable type music players, the number of users who are employing this type of audio download service has increased spectacularly.

Furthermore, with regard to the audio items which are downloaded, techniques for summarizing how each of the users evaluates each of his downloaded items, and for taking advantage of these summarized results for marketing or the like, have been proposed in Japanese Laid-Open Patent Publication 2005-352601, Japanese Laid-Open Patent Publication 2001-338236, Japanese Laid-Open Patent Publication 2001-147939, etc.

However, the techniques proposed in these documents are techniques for providing information to the suppliers of the items of audio contents for marketing or the like, and are not directed to providing the summarized results of these evaluations to the various users. Due to this, a user has only been able to evaluate audio items on his individual basis, and has not been able to share in common the evaluations of these audio items performed by other people. Furthermore if, while a user downloads an item of audio contents, the summarized result of evaluations by other persons with regard to this item of audio contents were to be displayed to him, then, during the download, the user would become aware in advance of these displayed evaluations of this item by other people, so that the number of users who were not able to evaluate this item of audio contents in an unbiased manner according to their own reactions would be increased. As a result, the reliability of the summarized evaluations of the various items of audio contents would be decreased.

Thus, with the prior art techniques mentioned above, it has not been possible to make the fact that evaluations with regard to items of audio contents are shared in common between users be compatible with the goal of ensuring the reliability of the summarized results which are obtained by summarizing these evaluations of items of audio contents over a large number of users.

Accordingly, the object of the present invention is to provide an audio server, with which it is made possible for the sharing in common of evaluations of items of audio contents between users to be compatible with ensuring the reliability of the summarized results which are obtained by summarizing these evaluations of items of audio contents over a large number of users.

SUMMARY OF THE INVENTION

With the audio server of the present invention, a reception means receives, from an information processing device which is connected to this audio server via a network, a request for downloading an item of audio contents which is stored in an audio item data base. And a download means performs processing to download, to the information processing device, an item of audio contents corresponding to the download request which has been received by the reception means.

Furthermore, when some information processing device is connected to this audio server via the network, an evaluation request means requests this connected information processing device to notify evaluations for items of audio contents which this information processing device has downloaded in the past. And, when an evaluation for some item of audio contents has arrived from an information processing device which has been requested by the evaluation request means to provide notification of evaluations for items of audio contents, a summarization means summarizes evaluations for that item of audio contents, using the evaluation obtained this time. And a summarized results notification means notifies the results of summarization by the summarization means to the information processing device which provided this evaluation of that item of audio contents this time.

In this manner, the audio server only notifies an information processing device of the summarized results obtained by summarizing evaluations of an item of audio contents by a large number of users, if an evaluation of that item of audio contents has been notified by and has arrived from that information processing device. Accordingly, a user is only able to share the evaluations by other users of some item of audio contents, if he has himself notified the audio server of his evaluation of that item of audio contents. To put this in another manner, if a user has not himself notified the audio server of his evaluation of an item of audio contents, he is not able to share the evaluations by other users of that item of audio contents. In other words, when the user evaluates some item of audio contents, he is non aware of the evaluations by other users of this item of audio contents. Accordingly, it is possible to suppress increase of the number of users who are not able to evaluate items of audio contents on their own initiative and according to their own feelings, due to having previously seen evaluations by other users of the same items of audio contents. Because of this, it is possible also to ensure the reliability of the summarized results for items of audio contents, which are obtained by summarizing the evaluations by a large number of users.

BRIEF DESCRIPTION OF THE DRAWINGS

FIG. 3 is a figure showing evaluation information which is recorded in an evaluation data base.

DETAILED DESCRIPTION OF THE INVENTION

In the following, an audio server according to an embodiment of the present invention will be explained.

Figure 1:
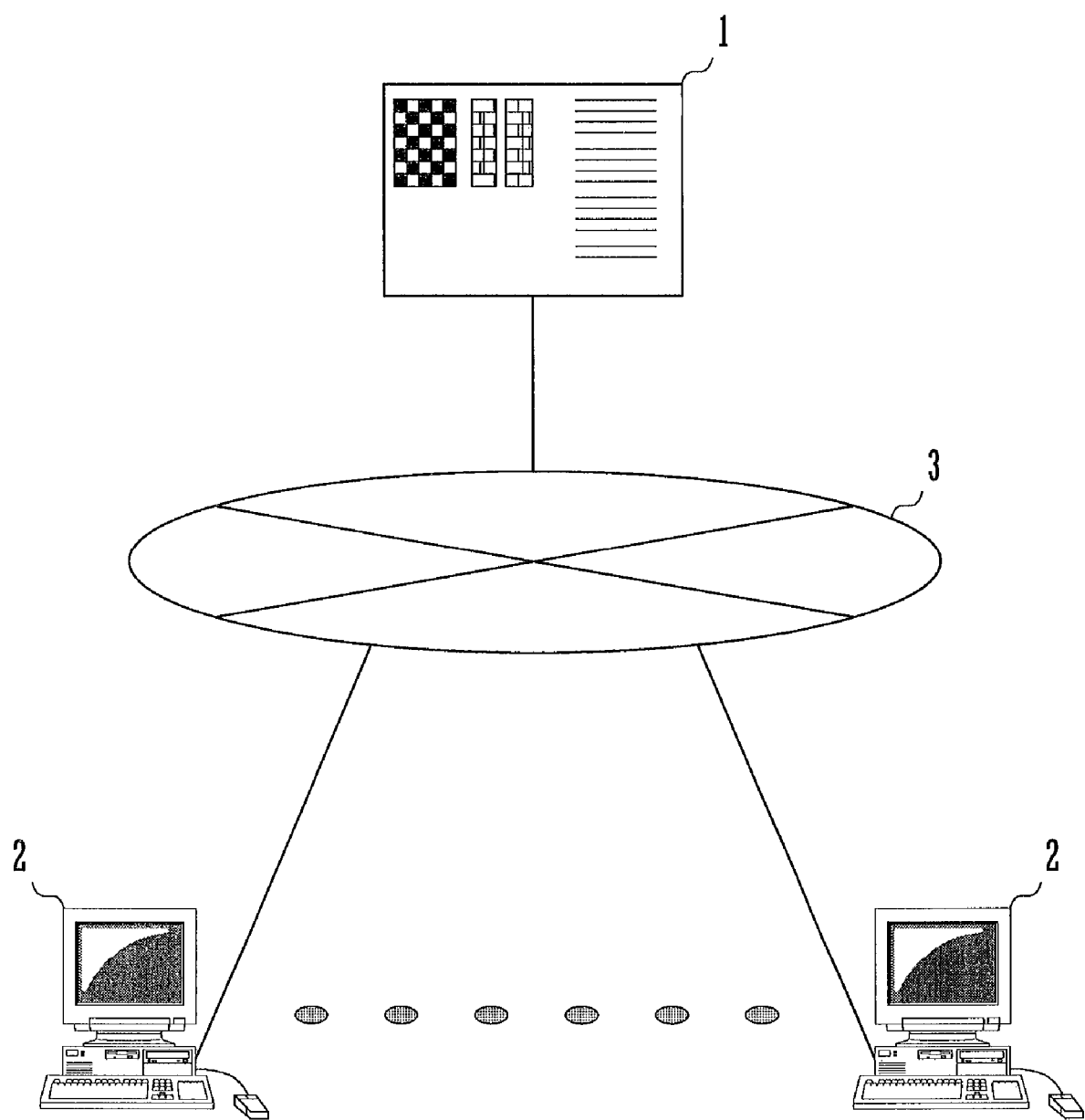
FIG. 1 is a schematic figure showing a downloading system employing an audio server, according to an embodiment of the present invention.

FIG. 1 is a schematic figure showing a downloading system which employs an audio server, according to this embodiment. In this downloading system, an audio server 1 is connected to a network 3 such as the internet or the like. Furthermore, various information processing devices 2 such as personal computers or portable terminals or the like, which are actuated by users, are able to access the audio server 1 via the network 3. Upon the audio server 1, a plurality of items of audio contents are recorded. Each user is able to actuate one of the information processing devices 2 and thereby to access the audio server 1 via the network 3, and thus is able to download any desired item of audio contents from the audio server 1. This download system may be a system which performs a downloading service to the user for these items of audio contents free of cost, or may be a system which levies a cost upon the user. In the case of a charge-based system, in the settlement method which is employed, such as a per se known credit card type system or the like, a charge may be levied according to each item of audio contents which has been downloaded. Furthermore, for each item of audio contents which has been downloaded by each user, this audio server 1 requests him to notify an evaluation of that item of audio contents. The user notifies the audio server 1 of his own evaluation with regard to an item of audio contents which he has downloaded, by actuating his information processing device 2. In this embodiment, the user evaluates each item of audio contents which he downloads as deserving one of five evaluation levels. To put this in another manner, the audio server 1 acquires an evaluation by the user of the audio contents which he has downloaded as a classification into one of five evaluation levels.

Moreover, this audio server 1, along with summarizing the evaluations which it has acquired from the various users for each item of audio contents, also notifies these summarized results to the various information processing devices 2. As will be described hereinafter, when the audio server 1 obtains an evaluation of some item of audio contents from any one of the information processing devices 2, the audio server 1 summarizes all the current evaluations for this item of audio contents, and notifies the result of this summarizing to that information processing device 2 from which it has just received this evaluation of this item of audio contents.

Figure 2:
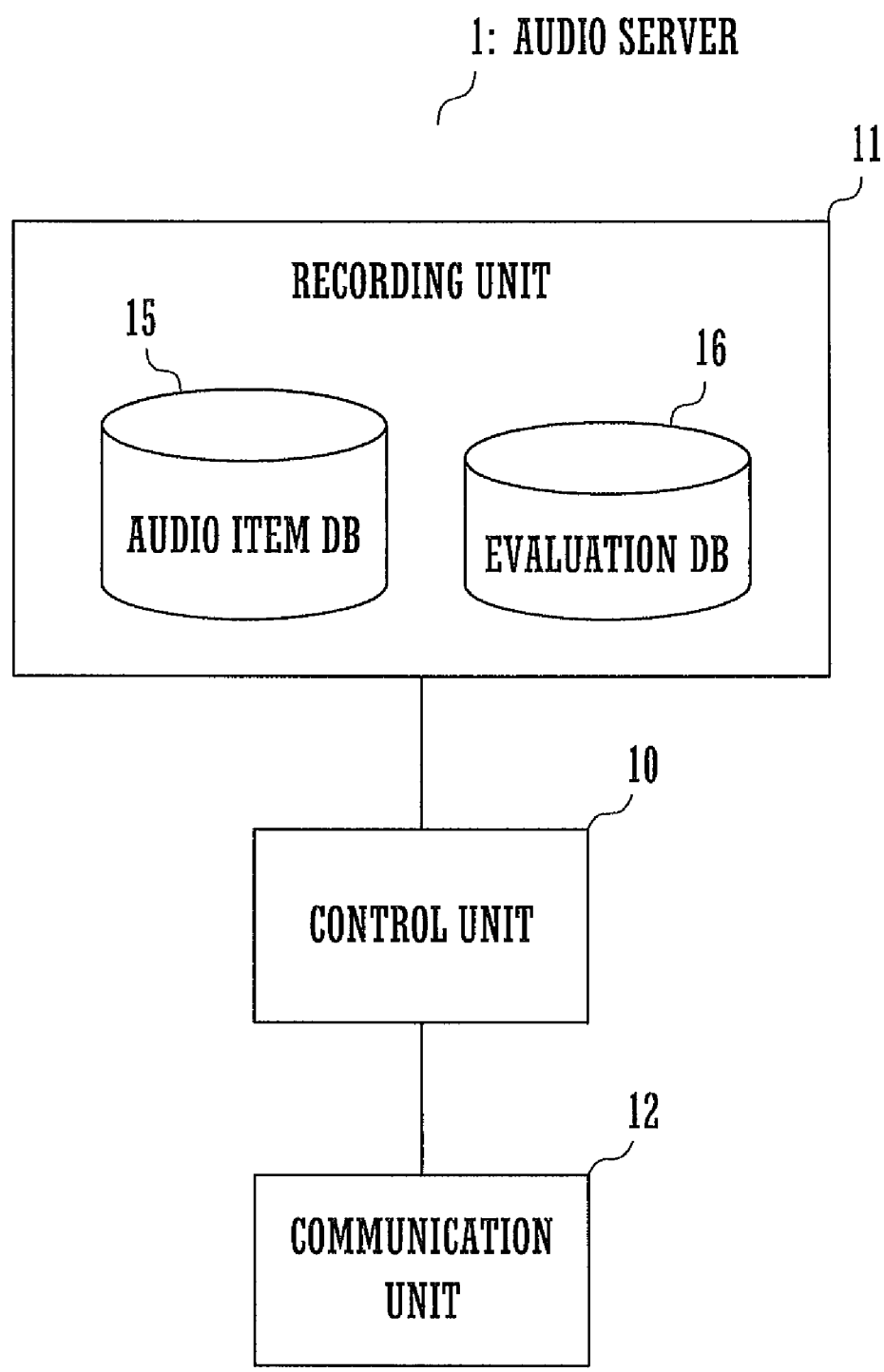
FIG. 2 is a figure showing the structure of the main portion of the audio server of this embodiment.

FIG. 2 is a figure showing the structure of the main portion of this audio server 1 of the embodiment. This audio server 1 comprises a control unit 10, a recording unit 11, and a communication unit 12. The control unit 10, along with controlling the operation of various sections within the main body of the audio server 1, also performs summarization processing and so on, as will be described hereinafter. The recording unit 11 comprises an audio item data base 15 in which a large number of items of audio contents are recorded, and an evaluation data base 16 in which, for each item of audio contents, evaluation information is recorded regarding evaluations which have been received from users. As shown in FIG. 3, the evaluation information which is recorded in this evaluation data base 16 is information in which, for each of the items of audio contents, each level of evaluation, and the number of people who have evaluated this item of audio contents as being deserving of that level of evaluation, are kept in mutual correspondence. In FIG. 3, the number of each item of audio contents is a number which identifies this item of audio contents. The communication unit 12 performs data communication with the information processing devices 2 which are connected to this server 1 via the network 2: in this data communication the server 1, for example, performs downloading of items of audio contents, acquisition of evaluations regarding items of audio contents, and so on.

Since the information processing devices 2 are usually per se known personal computers or portable terminals, detailed explanation thereof will herein be omitted. However each of the information processing devices 2 is endowed with the function of, for each item of audio contents which it has downloaded from the audio server 1, storing and managing the date and time when it downloaded that item, whether or not the user has notified the audio server 1 of an evaluation of that item, and the like.

Figure 4:
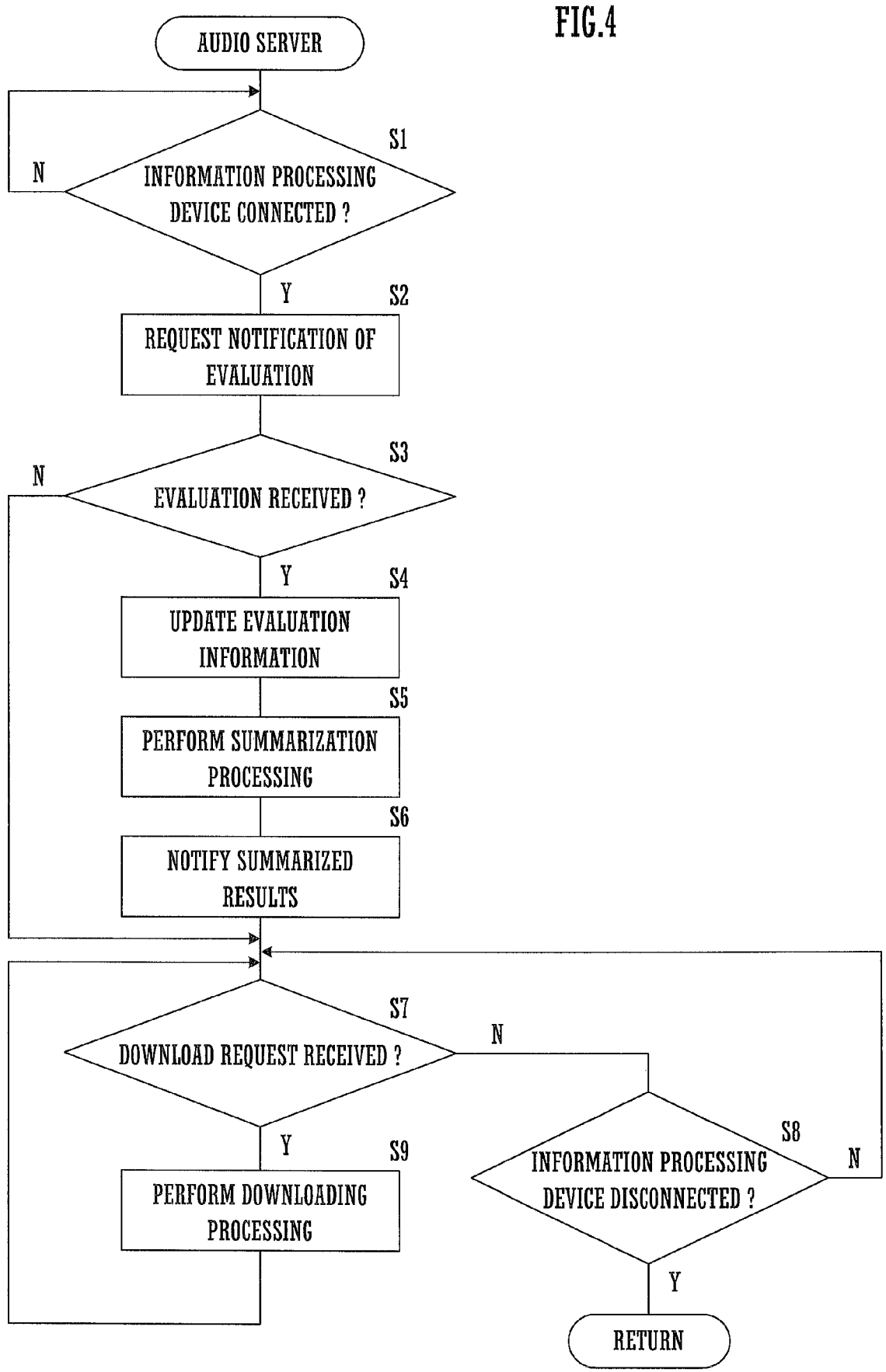
FIG. 4 is a flow chart showing the operational sequence of this audio server.

Next, the operation of the audio server 1 according to this embodiment will be explained. FIG. 4 is a flow chart showing the operational sequence of this audio server 1. When an information processing device 2 is connected via the network 3 (a step S1), the audio server 1 requests this information processing device 2 to notify evaluations for items of audio contents which it has downloaded in the past (a step S2). In detail, in this step S2, the server 1 specifies a time interval, and requests a notification of evaluations for items of audio contents which this particular information processing device 2 has downloaded within this time interval. In more concrete terms, the server 1 requests the information processing device 2 to notify evaluations for audio contents which it has previously downloaded for which, from the day of download, a time period greater than or equal to a first time interval (for example one week) has elapsed and moreover a time period greater than or equal to a second time interval (for example three weeks) has not elapsed. Although this will be obvious from the above, the first time interval should be shorter than the second time interval. Furthermore, the first time interval and the second time interval are determined in advance. Moreover, when issuing this notification request in the step S2, the audio server 1 only requests notification of evaluations for items of audio contents for which no evaluations have yet been received from this user. In other words, the server 1 does not issue any request for notification of evaluation for any item of audio contents for which an evaluation has already been received from this information processing device 2 which is currently connected. Accordingly receipt of duplicate evaluations is avoided.

For each item of audio contents which the information processing device 2 has downloaded from the audio server 1, it stores the date and time that it downloaded this item and an evaluation for the contents of this item, in correspondence with a flag that indicates whether or not the information processing device 2 has notified this evaluation of this item of audio contents to the audio server 1. And, when a request for any outstanding evaluations arrives from the audio server 1, the information processing device 2 decides upon whether or not there are any items of audio contents which were downloaded in the specified time interval, and for which evaluation has not yet been notified to the audio server 1. And, if at least one such item of audio contents is present, then the information processing device 2 displays a confirmation screen, upon which the user is invited to confirm whether or not to notify the audio server 1 of the evaluation (s) for these item(s) of audio contents. And if, during this display of the confirmation screen, the user performs actuation which signifies that the evaluation (s) should thus be notified, then the information processing device 2 notifies the evaluation (s) of the corresponding item(s) of audio contents to the audio server 1. On the other hand if, during this display of the confirmation screen, the user performs actuation which signifies that the evaluation (s) should not thus be notified, then the information processing device 2 does not notify the evaluation (s) of the corresponding item(s) of audio contents to the audio server 1, but rather notifies the audio server 1 of refusal. Furthermore, if there are no such items of audio contents, then the information processing device 2 notifies the server 1 to that effect.

By performing the processing in the step S2, the audio server 1 issues a command to the information processing device 2, commanding it to perform the operations described above. Moreover, in order to perform this command in an adequate manner, it performs data communication with the information processing device 2, via the communication unit 12.

If an evaluation for any item of audio contents has been received from the information processing device 2 (the step S3), the audio server 1 updates the evaluation information recorded in the evaluation data base 16 for this item of audio contents for which an evaluation has just been received (a step S4). In this step S4, the number of persons corresponding to the level of evaluation which has just been received for this item of audio contents is incremented by 1. And, if evaluations for a plurality of items of audio contents have been received, the audio server 1 performs updating of the above described evaluation information for each item of audio contents for which an evaluation has just been received. Then the audio server 1 performs summarization processing (in a step S5) by summarizing the evaluations for the items of audio contents whose evaluation information has been updated in the step S4. In this step S5, calculation processing is performed to obtain the average values of the evaluations for each of these items of audio contents. To express this in a simple manner, this processing is performed by calculating the product of the value for each level of evaluation and the number of persons corresponding to this level, by summing together these products for all the evaluation levels, and by then dividing this sum by the number of persons who have provided evaluations (in other words, the sum of the numbers of persons corresponding to all of the levels); and the resultant value is considered to be the summarized evaluation result.

Next, for the item(s) of audio contents for which evaluation (s) were notified from the information processing device 2 this time, the audio server 1 notifies the information processing device 2 (in a step S6) of the summarized result(s) for which it performed summarization processing this time. In this step S6, if summarization processing was performed for a plurality of items of audio contents, the summarized results for each of these items of audio contents is notified. In this manner, the audio server 1 notifies that information processing device 2 from which evaluation (s) for item(s) of audio contents were notified, of the summarized results for these item(s) of audio contents. To put this in another manner, it is possible for summarized results for those items of audio contents for which evaluations were notified by an information processing device 2 to the audio server 1, to be obtained by that information processing device 2.

Thereafter, the audio server 1 waits until either a request related to downloading of some item of audio contents arrives from this information processing device 2, or this information processing device 2 cuts off communication (steps S7 and S8). Moreover, if no evaluation of any item of audio contents was received in the step S3, in other words if a notification was received to the effect that no evaluations of any items of audio contents were available, or if a notification of refusal of evaluation was received, then the audio server 1 does not perform the processing of the steps S4 through S6 above, but only performs the processing of the step S7 and subsequently. If a request arrives from the information processing device 2 for the audio server 1 to download any item of audio contents which is recorded in the audio item data base 15, then the audio server 1 performs processing for downloading this item of audio contents to the information processing device 2 (in a step S9), and then the flow of control returns to the step S7. At this time, the audio server 1 does not notify the information processing device 2 of the summarized results for the item of audio contents which has been thus downloaded. Moreover, if the information processing device 2 is disconnected, then the flow of control returns to the step S1.

In this manner, only for those items of audio contents for which the user of the information processing device 2 has made and notified evaluations, the audio server 1 of this embodiment notifies the information processing device 2 of the summarized results obtained by summarizing the evaluations of those items of audio contents by a large number of users. Accordingly, the user is able to share the evaluations by other users of those items of audio contents for which he himself has made and notified evaluations. Moreover, since the audio server 1 does not notify the information processing device 2 of the summarized results for an item of audio contents which it is downloading, accordingly, when evaluating some item of audio contents, the user cannot become aware of evaluations of this item of audio contents by other users. Therefore, it is possible to suppress increase of the number of users who cannot evaluate an item of audio contents according to their own initiative and feelings, due to evaluations by other users becoming previously known to them. Moreover, due to this, it is possible to ensure the reliability of the summarized results which become available due to summarization of the evaluations of the various items of audio contents by a large number of users.

Moreover, since the audio server 1 requests notification of evaluation of items of audio contents which have been downloaded by the information processing device 2 during a time interval which is set in advance, accordingly it is possible to suppress receipt of an evaluation of an item of audio contents which has been downloaded by a user who is hardly interested in that item of audio contents. Due to this, the evaluation of some item of audio contents obtained from a user suppresses any vague evaluation by that user. Accordingly, it is possible to enhance the reliability of the summarized results of summarizing the evaluations of items of audio contents by a large number of users to yet a further extent.

It should be understood that although, in the explanation of this embodiment, the case was taken in which both an upper limit (the second time interval) and a lower limit (the first time interval) were set for the time interval over which notifications of evaluations were requested, it would also be acceptable to arrange for only a lower limit to be set (i.e. it would be acceptable for no upper limit to be set).

Moreover, for items of audio contents for which evaluations have already been obtained from that information processing device 2 which is connected this time, the audio server 1 does not request any repeated notification of evaluations for these items of audio contents. Due to this, requests for evaluation of the same item of audio contents from the same user are not repeated. Accordingly, it is possible to enhance the reliability of the summarized results obtained by summarizing the evaluations of items of audio contents by a large number of users by yet a further level.

It should be understood that although, in the embodiment described above, by way of example, a case was explained in which the evaluation of each item of audio contents was performed by assigning it to one of five levels, this is not to be considered as being limitative of the present invention; it would also be acceptable to arrange for these evaluations to be performed in ten levels, twenty levels, or indeed any number of levels.

It should be understood that, in the above described explanation of an embodiment of the present invention, all of the features are shown by way of example, and should not be considered as being limitative of the present invention. The scope of the present invention is not to be defined by any of the features of the embodiment described above, but only by the scope of the appended Claims. Moreover, equivalents to elements in the Claims, and variations within their legitimate and proper scope, are also to be considered as being included within the range of the present invention.

What is claimed is:

1. An audio server, comprising:
   an audio item data base which stores a plurality of items of audio contents;
   reception means which receives, from an information processing device that is connected to said server via a network, a request for downloading an item of audio contents stored in said audio item data base;
   download means which downloads, to said information processing device, an item of audio contents corresponding to said download request which has been received by said reception means;
   evaluation request means which, when an information processing device is connected to said server via said network, requests said connected information processing device to notify evaluations for items of audio contents which said information processing device has downloaded in the past;
   summarization means which, when an evaluation for some item of audio contents has arrived from an information processing device that has been requested by said evaluation request notification means to provide notification of evaluations for items of audio contents, summarizes, using the evaluation obtained this time, evaluations for that item of audio contents; and
   summarized results notification means which notifies the results of summarization by said summarization means to the information processing device which provided said evaluation of that item of audio contents this time;
   wherein said evaluation request means is a means which requests said information processing device to notify evaluations of items of audio contents for which, after download, a period of time has elapsed which is greater than or equal to a first time interval set in advance.

2. An audio server according to claim 1, wherein said evaluation request means is a means which requests said information processing device to notify evaluations of items of audio contents for which, after download, a period of time has elapsed which is greater than or equal to a first time interval set in advance.

3. The audio server according to claim 1, wherein said evaluation request means requests said information processing device to notify evaluations of items of audio contents for which, after download, a period of time has elapsed which is less than or equal to a second time interval greater than said first time interval.

4. The audio server according to claim 1, wherein said evaluation request means requests said information processing device to notify evaluations of items of audio contents for which, after download, evaluation has not yet been notified.

5. The audio server according to claim 1, wherein said summarized results notification means does not notify said information processing device of evaluations for this item of audio contents which is being downloaded, when downloading an item of audio contents to said information processing device.

* * * * *